Patented June 29, 1926.

1,590,388

UNITED STATES PATENT OFFICE.

ROBERTO LEPETIT, OF MILAN, ITALY.

MANUFACTURE OF DRY PRODUCTS FROM PANCREAS.

No Drawing. Application filed September 22, 1922, Serial No. 589,952, and in Italy November 12, 1921.

This invention relates to the manufacture of useful products from pancreas; and it relates more particularly to the preparation of novel pancreas products in substantially dry pulverulent form by grinding or otherwise disintegrating pancreas glands in commixture with moisture-absorbing material that is chiefly inorganic and that most desirably consists largely of anhydrous salts, especially lime sulphate, sodium sulphate, magnesium sulphate or the like, the mixture also advantageously including common salt and a nitrogenous salt such as ammonium chlorid; the grinding being continued until the mixture is reduced to a fine powder that is substantially dry, said powder possessing diastatic and proteolytic efficiency. The pancreas preparations thus obtained are useful, for example, as artificial bates in tanning and also for other purposes.

Heretofore, pancreas preparations to be used as artificial bates have been prepared by pressing the pancreatic juice from pancreatic glands, impregnating sawdust or other inert bodies or salts with the liquid extracted, and then drying the mixture at a low temperature. The present applicant has found that superior results can be obtained, and the convenience of manufacture increased, by grinding the pencreas, previously freed from fat, with a suitable quantity of salts, preferably substantially anhydrous, capable of absorbing a certain amount of water with formation of crystallized salts, to obtain a dry comminuted product. The pancreas glands used may be either fresh or pickled, the latter being ordinarily to be preferred. Among the moisture-absorbing salts suitable for use may be mentioned particularly common plaster (lime sulphate or calcium sulphate), which is not only effective as a moisture-absorbent but which also possesses marked activating properties causing it, as found in practical use, to act better as a catalyzer than other lime salts. Besides plaster, other suitable anhydrous salts are sodium or magnesium sulphate together with a certain amount of common salt (sodium chlorid) and a nitrogenous salt, such as ammonium salt, which has a favorable action where the pancreas product is used in the tannery in the puering process.

In a typical illustrative example, the preparation of the novel product may be effected as follows: 15 to 20 kilograms of previously ground pancreas, either fresh or still better pickled with salt and boric acid, are mixed in a suitable mixing machine with 9 kilograms of powdered plaster (sulphate of lime), 16 kilograms of well dried common salt, 15 kilograms of anhydrous sodium sulphate, and about 15 kilograms of ammonium chlorid. The cells of the glands are consequently broken down for the most part and the liquid contents of the cells containing the enzyms are immediately absorbed by the salts. As a result of the mixing treatment, an almost dry whitish powder results which can easily be completely dried. This product is then sent through a disintegrator in order to more completely split or break down the cell tissue. In addition to the inorganic salts above mentioned, the mixture may contain a certain amount of a carbohydrate substance, such as sugar, starch, flour or sawdust, as a further ingredient.

Assuming the employment of the same amount of pancreas and the production of the same amount of final dry product, the product prepared according to the present process, which is partially soluble in water, has higher proteolytic and diastatic power than an equal weight of a dry product obtained by impregnating sawdust or the like with juice of the pancreas gland. The present product is further characterized by the fact that it contain fibrous organic substances and fragments of ground pancreas cells which can be easily detected under the microscope.

It is to be understood that the present invention is not limited to the procedure given in detail in the foregoing illustrative example, and that many variations may be made in the procedure and in the specific composition of the novel products without departing from the scope of the invention. For instance, the proportions of the salts employed may be varied within reasonable limits, and the salts specifically mentioned may be replaced in part by similarly acting substances. Thus, for example, cement may replace part of the plaster; anhydrous magnesium sulphate or anhydrous sodium phosphate may replace the sodium sulphate either wholly or in part; and similarly ammonium sulphate or nitrate may be used instead of ammonium chlorid.

What is claimed is:

1. In the manufacture of useful pancreas products, the process which comprises disintegrating a mixture of pancreas gland tissue and moisture-absorbing material that is chiefly inorganic.

2. In the manufacture of useful pancreas products, the process which comprises disintegrating a mixture of pancreas gland tissue and moisture-absorbing material, including a salt of an alkaline base.

3. In the manufacture of useful pancreas products, the process which comprises grinding together pancreas gland tissue and moisture-absorbing material, including a substantially anhydrous inorganic salt, to obtain a substantially dry comminuted product.

4. In the manufacture of useful pancreas products, the process which comprises grinding together pancreas gland tissue and moisture-absorbing material, including a substantially anhydrous inorganic salt, and a nitrogenous salt, to obtain a substantially dry comminuted product.

5. In the manufacture of useful pancreas products, the process which comprises grinding together pancreas gland tissue and moisture-absorbing material, including an inorganic salt of calcium, to obtain a substantially dry comminuted product.

6. In the manufacture of useful pancreas products, the process which comprises grinding together pancreas gland tissue and moisture-absorbing material, including inorganic salts of calcium and sodium, to obtain a substantially dry comminuted product.

7. In the manufacture of useful pancreas products, the process which comprises grinding together pancreas gland tissue and moisture-absorbing material, including inorganic salts of calcium and sodum, and a nitrogenous salt, to obtain a substantially dry comminuted product.

8. In the manufacture of useful pancreas products, the process which comprises grinding together pancreas gland tissue and moisture-absorbing material, including inorganic salts of calcium and sodium, a nitrogenous salt, and a carbohyrate substance, to obtain a substantially dry comminuted product.

9. In the manufacture of useful pancreas products, the process which comprises grinding a mixture comprising pancreas gland tissue, calcium sulphate, sodium chlorid, and a nitrogenous salt, until a pulverulent product results.

10. As a new article of manufacture, a diastatic and proteolytic composition comprising pancreas gland substance, including the gland tissue, intimately commingled with carrier material that is principally inorganic, said composition being substantially dry and in finely divided condition.

11. As a new article of manufacture, the composition claimed in claim 10, further characterized by the fact that said carrier material includes an inorganic salt of an alkaline-base-forming metal.

12. As a new article of manufacture, the composition claimed in claim 10, further characterized by the fact that said carrier material includes an inorganic salt of calcium.

13. As a new article of manufacture, the composition claimed in claim 10, further characterized by the fact that said carrier material includes inorganic salts of calcium and sodium.

14. As a new article of manufacture, the composition claimed in claim 10, further characterized by the fact that said carrier material includes inorganic salts of calcium and sodium, and an inorganic ammonium salt.

15. As a new article of manufacture, a whitish pulverulent composition comprising pancreas gland substance, including the gland tissue, intimately commingled with inorganic salts of sodium and an alkali earth metal, and an inorganic ammonium salt.

16. As a new article of manufacture, the composition claimed in claim 15 further characterized by containing cement as an ingredient.

17. As a new article of manufacture, the composition claimed in claim 15 further characterized by containing cement and a carbohydrate as ingredients.

In testimony thereof I have hereunto set my hand this 2nd day of September, 1922.

Dr. ROBERTO LEPETIT.